United States Patent [19]

Van Helden et al.

[11] Patent Number: 5,135,976

[45] Date of Patent: Aug. 4, 1992

[54] MELT STABILIZED POLYKETONE COPOLYMER COMPOSITIONS CONTAINING GLYCIDYL ETHER COMPOUND

[75] Inventors: Arend Kuindert Van Helden; Wilhelmus J. Klaver; Abraham A. Smaardijk, all of Amsterdam, Netherlands

[73] Assignee: Shell Oil Company, Houston, Tex.

[21] Appl. No.: 740,551

[22] Filed: Aug. 5, 1991

[30] Foreign Application Priority Data

Aug. 7, 1990 [GB] United Kingdom ............... 9017267

[51] Int. Cl.$^5$ ............................................. C08K 5/15
[52] U.S. Cl. ................................................... 524/114
[58] Field of Search ...................... 524/114, 366, 376

[56] References Cited

U.S. PATENT DOCUMENTS

| | | | |
|---|---|---|---|
| H732 | 2/1990 | Lutz | 525/472 |
| 3,948,832 | 4/1976 | Hudgin | 528/392 |
| 5,028,652 | 7/1991 | Smutny et al. | 524/434 |

OTHER PUBLICATIONS

Plastics Additives Handbook, pp. 230–231, Edited by R. Gächter and H. Müller, Hanser Publishers, New York.

*Primary Examiner*—Paul R. Michl
*Assistant Examiner*—Tae H. Yoon
*Attorney, Agent, or Firm*—James O. Okorafor

[57] ABSTRACT

A melt stabilized copolymer composition comprising a major amount of an alternating copolymer of carbon monoxide with one or more olefinically unsaturated compounds and a minor amount of at least one stabilizing additive which stabilizing additive is a glycidyl ether which comprises per molecule at least one epoxy group and at least one functional group selected from primary alcoholic hydroxy groups and ketonic carbonyl groups. A process for producing the composition and the melt stabilizing agents are also disclosed.

17 Claims, No Drawings

MELT STABILIZED POLYKETONE COPOLYMER COMPOSITIONS CONTAINING GLYCIDYL ETHER COMPOUND

FIELD OF THE INVENTION

This invention relates to copolymer compositions comprising a major amount of an alternating copolymer of carbon monoxide with one or more olefinically unsaturated compounds and a minor amount of at least one stabilizing additive.

BACKGROUND OF THE INVENTION

The relevant copolymers are characterized by having a repeating structure [A-CO] which implies that a unit A is positioned left and right in between carbonyl units. A is a unit derived from an olefinically unsaturated compound. The term "copolymer" includes terpolymers in which different units A are present. Thus, the copolymers are copolymers of carbon monoxide and one or more olefinically unsaturated compounds. Examples of suitable olefinically unsaturated compounds yielding a unit A are ethene, propene, butene, octene, styrene and acrylate esters. The copolymers mentioned above are known per se, cf. EP-A-121965 and EP-A-181014. Whilst these copolymers have attractive physical and mechanical properties such as yield stress, tensile strength, impact strength and flexural modulus, in some instances their processing properties can be further improved.

Melt processing, e.g., extrusion, of copolymers with an intrinsic viscosity, or limiting viscosity number (LVN), above about 2.0 dl/g (measured at 60° C. in m-cresol) is adversely affected by a poor melt stability which is apparent from a notable increase of the viscosity of the melt vs. residence time. Since copolymers with a high LVN have better physical properties as engineering thermoplastic, this problem needs to be solved. Especially in fibre and sheet applications, melt-extrusion is a critical step, even for copolymers with a low LVN.

Copolymer compositions comprising a major amount of an alternating copolymer of carbon monoxide with one or more olefinically unsaturated compounds and a minor amount of at least one stabilizing additive are known in the art. The stabilizing additive may be an epoxy resin containing glycidyloxy groups, i.e. groups of the formula

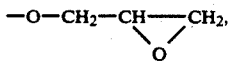

for example epoxy resins prepared from epichlorohydrin and 2,2-bis (4-hydroxyphenyl) propane. Whilst the addition of such compounds to the copolymers brings about an improvement of the stability of the melt, it appears that especially for melt processing operations in commerical production of moulded parts and extrusion at commercial scale of fibres and sheet, the melt stability could be improved even further. It is the object of the present invention to provide copolymer compositions having further improved melt stability.

It has now been found that a high degree of melt stability of the copolymers can be achieved by the addition thereto of a glycidyl ether which comprises primary hydroxy groups or keto groups. The melt stability obtainable by the addition of such glycidyl ethers is better than the melt stability obtainable by application of the known stabilizers, viz., epoxy resins prepared from epichlorohydrin and 2,2-bis(4-hydroxyphenyl)-propane which epoxy resins contain secondary hydroxy groups.

The present finding is surprising in the light of U.S. Pat. No. 3,948,832 which patent deals with the stabilization of polymers of carbon monoxide and one or more olefinically unsaturated compounds having a lower content of carbonyl units than the alternating copolymers of the present invention. This patent teaches that the polymers with low content of carbon monoxide can be stabilized by the addition of epoxy compounds and that the preferred stabilizing epoxy compounds are those which are the least sensitive to oxidative degradation. Contrary to these results and quite unexpected, it has now been established that, when applying an alternating copolymer, glycidyl ethers which comprise primary aliphatic or primary benzylic hydroxy groups or ketonic carbonyl groups provide a higher degree of melt stability than glycidyl ethers which comprise secondary hydroxy groups or glycidyl ethers or epoxides which do not comprise other functional groups than the glycidyloxy or epoxy groups, despite the fact that primary aliphatic and benzylic hydroxy groups and ketonic carbonyl groups may be expected to be more sensitive to oxidation than secondary hydroxy groups or hydrocarbyl groups.

Some of the epoxy compounds which have been found to increase the melt stability of the alternating copolymers are novel compounds.

SUMMARY OF THE INVENTION

Accordingly, the invention relates to novel copolymer compositions comprising a major amount of an alternating copolymer of carbon monoxide with one or more olefinically unsaturated compounds and a minor amount of at least one stabilizing additive, characterized in that the stabilizing additive is a glycidyl ether which comprises per molecule at least one epoxy group and at least one functional group selected from primary alcoholic hydroxy groups and ketonic carbonyl groups.

The invention also relates to a process for improving the melt stability of copolymers of carbon monoxide with one or more olefinically unsaturated compounds comprising the addition thereto of a minor amount of at least one stabilizing additive characterized in that the stabilizing additive is a glycidyl ether which comprises per molecule at least one epoxy group and at least one functional group selected from primary alcoholic hydroxy groups and ketonic carbonyl groups. Finally the invention relates to novel glycidyl ethers and to novel chemical compounds which are intermediates in the preparation of the novel glycidyl ethers.

DETAILED DESCRIPTION OF THE INVENTION

The stabilizing additive according to the invention is a glycidyl ether which comprises per molecule at least one epoxy group and at least one functional group selected from primary alcoholic hydroxy groups and ketonic carbonyl groups. The glycidyl ethers which act as stabilizing compound according to the invention may comprise any number of epoxy groups. Suitably they comprise 1-3 epoxy groups per molecule. The molecular weight of the glycidyl ether is not important. However, compounds having a high molecular weight may be difficult in blending with the copolymers of the invention. When the molecular weight is too low, the compounds may be too volatile. If the glycidyl ethers containing 1-3 epoxy groups per molecule have an epoxy group content of from 0.1 to 10 eq/kg the molecular weights are sufficiently low for easy blending of the compounds into the composition and sufficiently high for a conveniently low volatility. Preferably, the glycidyl ethers have an epoxy group content of at least 0.3 eq/kg, and in particular at least 0.5 eq/kg.

The glycidyl ethers of the invention possess at least one functional group selected from the group consisting of primary alcoholic hydroxy groups and ketonic carbonyl groups. Examples of such glycidyl ethers are 4,7-dioxo-1,10-decylene diglycidyl ether, the mono-, di- and triglycidyl ethers of pentaerythritol and 1,4-bis(3-glycidyloxy-1-oxo-propyl)benzene.

In a preferred embodiment of the invention the glycidyl ethers are selected from the group consisting of
a) glycidyl ethers having the general formula (I)

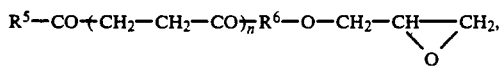

wherein $R^5$ is an alkyl group having up to 7 carbon atoms, n is 1 or 2, preferably n is 1, and $R^6$ is an alkylene bridging group having up to 6 carbon atoms, and
b) glycidyl ethers having the general formula (II)

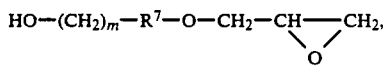

wherein m is an integer ranging from 1-6 and $R^7$ is an (alk)arylene group having 6-10 carbon atoms.

The alkyl group $R^5$ may be a n-alkyl group, such as the n-pentyl group, a branched alkyl group, such as the tert-butyl group or a cyclic alkyl group, such as the 4-methylcyclohexyl group. Typically $R^5$ is a methyl group. The alkylene group $R^6$ may be straight, branched or cyclic. Eligible groups $R^6$ are the 2,3-dimethyl-1,4-butylene group, the 1,4-cyclohexylene group and the hexamethylene group. Preferably $R^6$ is an alkylene bridging group having 3 to 6 carbon atoms of which 3 carbon atoms occur in the bridge, for example the 2,2-dimethyl-1,3-propylene group or the 1,3-cyclopentylene group. Particularly $R^6$ is the trimethylene group. Examples of the (alk)arylene group $R^7$ are 2,3,5,6-tetramethyl-1,4-phenylene, 1,4-naphthylene or 1,5-naphthylene. Preferably, $R^7$ is an unsubstituted 1,2-arylene group, such as 1,2-naphthylene. In particular, $R^7$ is an unsubstituted 1,2-phenylene group. The group $-(CH_2)_m-$ may eligibly represent the hexamethylene group or the tetramethylene group. Suitably, m=1, so that $-(CH_2)_m-$ suitably represents a methylene group.

Examples of preferred glycidyl ethers are glycidyl 10-methyl-3,6,9-trioxoundecyl ether, glycidyl 7,10-dioxododecyl ether, glycidyl 8-(2-hydroxyethyl)naphthyl ether and glycidyl 4-(3-hydroxypropyl)-2,3,5,6-tetramethylphenyl ether. More preferred glycidyl ethers are, for example, glycidyl 4,7,10-trioxoundecyl ether, glycidyl 4,7-dioxononyl ether and glycidyl 2-(hydroxymethyl)naphthyl ether. Excellent results can be been achieved when the stabilizing additive is selected from the group consisting of glycidyl 2-hydroxymethylphenyl ether and 4,7-dioxooctyl glycidyl ether.

In another preferred embodiment of the invention the glycidyl ether is a modified epoxy resin that contains per molecule on average from 1.5 to 2.5 epoxy groups and at least one primary hydroxy group, which modified epoxy resin is obtainable by reacting
a) an epoxy resin having on average more than 1.5 and at most 2 glycidyloxy groups per molecule and an epoxy group content of from 1 to 7 eq/kg, with
b) an aliphatic tri- or tetrahydric primary alcohol having from 5 to 12 carbon atoms.

Such modified epoxy resins are known in the art. They may contain hard, infusible particles, hereinafter referred to as "gels". Preferably, such modified epoxy resins are chosen which are gel-free.

The epoxy resin with from 1.5 to 2 glycidyloxy groups may comprise diglycidyl ethers of aliphatic diols, such as 1,6-hexanediol. Typically, the epoxy resin with from 1.5 to 2 glycidyloxy groups per molecule comprises a diglycidyl ether of a dihydric phenol and, preferably, the diglycidyl ether of 2,2-bis(4-hydroxyphenyl)propane.

The aliphatic tri- or tetrahydric primary alcohol having from 5 to 12 carbon atoms preferably do not have secondary and tertiary hydroxy groups. Examples of the preferred alcohols are 1,1,1-tris(hydroxymethyl)propane, 1,2,3-tris(hydroxymethyl)propane, 1,1,1-tris(hydroxymethyl)hexane, 1,1,1-tris(hydroxymethyl)octane, 1-hydroxy-3-oxa-5,5-bis(hydroxymethyl)heptane 1,2,3,4-tetrakis(hydroxymethyl)butane and pentaerythritol. Particularly, the aliphatic primary alcohol is a trihydric alcohol, especially, a trimethylolpropane and in particular 1,1,1-trimethylolpropane.

Excellent results can be been achieved when the stabilizing additive is a modified epoxy resin having an epoxy group content of from 0.5-0.7 eq/kg and is obtainable by reacting the diglycidyl ether of 2,2-bis(4-hydroxyphenyl)propane with 1,1,1-trimethylolpropane.

The present copolymer compositions comprise a major amount of an alternating copolymer of carbon monoxide with one or more olefinically unsaturated compounds and a minor amount of at least one stabilizing additive of the invention. The expression "a minor amount" as used herein means less than 50% wt based on the weight of the composition in cases where the compositions consist only of polymer and stabilizing additive. Generally it will not be necessary to employ more than a certain amount to achieve an acceptable performance. Suitably the total amount of the stabilizing additives ranges from about 0.005 to about 1.0 eq/kg but not more than 20% wt based on the weight of the composition. More suitably the stabilizing additives are added in a quantity of from about 0.01 to about 0.5 eq/kg but not more than 10% wt based on the weight of the composition and especially from about 0.02 to about 0.2 eq/kg but not more than 5% wt.

The stabilizing additives of the invention may be used alone, or they may be used in combination with one or more additional additives which improve other properties of the compositions such as oxidative stability and UV stability. Such additional additives may be selected from the group consisting of sterically hindered phenolic compounds, aromatic amines, hydroxybenzophenones, hydroxyphenylbenzotriazoles, aluminium hydroxides, carboxylic esters of glycerol, acid amides of monocarboxylic acids, and copolymers of ethylene and acrylic acid or methacrylic acid. Some of these may be well-known additives for polymers, e.g. those marketed under the trademarks "IRGANOX", "IONOL", "TINUVIN", "CYASORB" and "NAUGARD". Suitably the hindered phenolic compounds are selected from 2,5-dialkylphenols, from esters of a straight chain alcohol and a hydroxy, dialkylphenyl-substituted carboxylic acid, from 1,2-bis(acetyl)hydrazines in which the acetyl group carries a hydroxy, dialkylphenyl substituent, from N,N'-bis(acetoxyalkyl)oxalamides in which the acetyl group carries a hydroxy, dialkylphenyl substituent, and from alpha-N, omega-N-bis(acetyl)-diamines in which the acetyl group carries a hydroxy, dialkylphenyl substituent. Suitable aromatic amines are selected from the group formed by the diphenylamines, such as 4,4'-bisbenzyl-diphenylamines or anilino-diphenylamines, and diaminonaphthalenes, such as N,N,N',N'-tetraalkylaminonaphthalenes. A suitable type of aluminium hydroxide is bayerite.

A skilled person will realize that some of the additional additives mentioned in the previous paragraph may be capable of reacting with the stabilizing additives of the invention through reactive hydrogen atoms. In such a case it may be advantageous that such a quantity of the stabilizing additive of the invention is applied in the composition so that there is an excess of epoxy groups over the active hydrogen atoms of the additional additive.

The alternating copolymer of carbon monoxide and one or more olefinically unsaturated compounds which is part of the compositions of the invention may be obtained by copolymerising the monomers in the presence of a catalyst composition comprising a compound of a metal chosen from Group VIII of the Periodic Table. In particular the alternating copolymer has been obtained using a catalyst composition comprising a palladium compound and a bidentate or a multidentate ligand. A special bidentate or a multidentate ligand is a bisphosphine or a multiphosphine. The catalyst compositions which comprise a palladium compound and a bidentate or a multidentate ligand, especially, a bisphosphine or a multiphosphine, are very active polymerisation catalysts so that the copolymers obtained may have a very low content of residual palladium. A very active polymerisation catalyst may, for example, be based on palladium acetate, 1,3-bis(diphenylphosphino)propane and trifluoroacetic acid. Preferably the copolymer have a palladium content below 100 ppm, in particular below 50 ppm, because these copolymers may have better melt stability than the copolymers which have a higher palladium content.

Many olefinically unsaturated compounds are eligible monomers in the copolymerisation with carbon monoxide in the presence of the catalyst compositions comprising a compound of a metal chosen from Group VIII of the Periodic Table which copolymerisation yields the copolymers of the invention. Typically the copolymer is a copolymer of carbon monoxide with at least one olefinically unsaturated hydrocarbon, in particular ethylene or a mixture of ethylene and propylene. Preferred copolymers are the copolymers having an LVN of at least 1.3 dl/g, better still at least 1.7 dl/g.

The stabilizing additives may be added to the copolymer by various continuous or discontinuous processes, for example, by dry blending and tumbling, or by solvent deposition and removal of the solvent by evaporation. The copolymer may be used in the form of a powder, or as a granulate, which may have been obtained by a melt processing technique.

The compositions of this invention can be processed into articles of manufacture such as fibres, films, laminates, tubes, piping and articles having an intricate shape by conventional processing techniques, such as melt spinning, extrusion, and co-extrusion, injection moulding and compression moulding.

The stabilizing additives of this invention do not only improve the melt stability of the relevant carbon monoxide/olefin co- and terpolymers, but they also render the co- and terpolymer better processable in melt processing operations. Thus they render processable certain types of copolymers which were hardly processable before the present invention.

Some of the stabilizing additives of the invention are novel compounds. Glycidyl ethers of general formula I are novel:

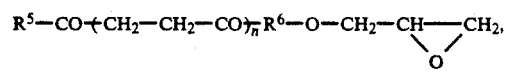

wherein $R^5$ is an alkyl group having up to 7 carbon atoms, preferably a methyl group, n is 1 or 2, preferably n is 1, and $R^6$ is an alkylene bridging group having up to 6 carbon atoms, preferably, an alkylene bridging group having 3 to 6 carbon atoms of which 3 carbon atoms occur in the bridge. In particular, $R^6$ is a trimethylene group.

These novel glycidyl ethers can be prepared by standard chemical reactions, for example, in the following way. Alkyl(hydroxyalkyl)furans of the general formula

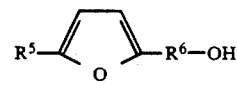

are obtainable, for example by reduction of the corresponding readily available carbonyl compounds. The alkyl(hydroxyalkyl)furans can be reacted with allyl chloride to yield allyl alkylfurylalkyl ethers of the general formula

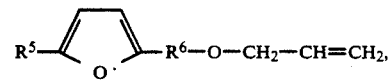

which ethers can be hydrolysed—with acid catalysis—to yield allyl dioxoalkyl ethers of the general formula $$R^5-CO-CH_2-CH_2-CO-R^6-O-CH_2-CH=CH_2.$$

The latter can be epoxidised, for example with m-chloroperbenzoic acid, to give the corresponding novel glycidyl ethers of formula I in which n is 1. The novel glycidyl ethers with n is 2 may be prepared, for example, following an analogous scheme via allyl furlalkyl ethers of the general formula

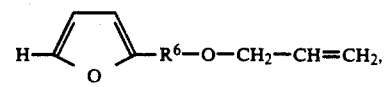

which allyl furylalkyl ether is reacted with an alpha-beta unsaturated ketone of the general formula

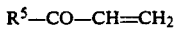

to yield allyl (oxoalkyl)furylalkyl ethers of the general formula

These allyl (oxoalkyl)furylalkyl ethers may be converted to the novel glycidyl ethers having n is 2 in two steps as indicated above, viz., by hydrolysis, to yield allyl trioxoalkyl ethers of the general formula

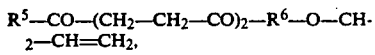

and subsequent epoxidation. In the latter seven formulae the symbols $R^5$ and $R^6$ have the meanings as given hereinbefore.

The intermediate chemical compounds suitable for the preparation of the glycidyl ethers of the general formula I, viz. the alkyl(hydroxyalkyl)furans, allyl alkylfurylalkyl ethers, allyl dioxoalkyl ethers, allyl furylalkyl ethers and allyl trioxoalkyl ethers given hereinbefore, are also novel compounds. The invention also relates to these novel intermediates and to the novel glycidyl ethers of the invention, and in particular to 2-(3-hydroxypropyl)-5-methylfuran, allyl 3-(5-methylfuryl-2)propyl ether, allyl 4,7-dioxooctyl ether and 4,7-dioxooctyl glycidyl ether.

The invention is further illustrated by the following non-limiting examples.

Examples 1 to 4 are related to the preparation of 4,7-dioxooctyl glycidyl ether-an inventive stablizer.

Examples 1 to 8, and 13 are according to the invention, while examples 9 to 12, and 14 are comparative examples.

EXAMPLE 1

A 250-ml round bottom flask equipped with a mechanical stirrer and a dropping funnel was charged with 16.99 g (0.45 mol) of sodium borohydride and 100 ml of 96-% ethanol. The dropping funnel was charged with a solution of 12.4 g (0.090 mol) of 3-(5-methylfuryl-2)propanal in 50 ml of a 3:1 (volume) mixture of ethanol and water. The contents of the dropping funnel were added drop-wise to the flask within 1 hour. During the addition the contents of the flask were stirred and kept at room temperature. After an additional 2 hour's stirring at room temperature, the contents of the flask were reduced in volume by evaporation using a rotatory evaporator. The residue obtained was extracted three times with chloroform. The combined extracts were dried over magnesium sulphate and evaporated to dryness, leaving 7.44 g of 2-(3-hydroxypropyl)-5-methylfuran as a clear colourless oil. The structure was confirmed by $^1$H-NMR spectroscopy. The signals were assigned to the underlined hydrogen atoms (shifts relative to TMS, chloroform-$d_1$ solvent):

| | |
|---|---|
| 5.75–5.95 ppm (multiplet, 2 H): | protons attached to furan ring |
| 3.6–3.8 ppm (multiplet, 2 H): | —CH$_2$—CH$_2$—CH$_2$—O— |
| 2.65 ppm (triplet, $^3J_{H-H}$ 7.0 Hz, 2 H): | —CH$_2$—CH$_2$—CH$_2$—O— |
| 2.23 ppm (singlet, 3 H): | CH$_3$— |
| 1.75–1.95 ppm (multiplet, 2 H): | —CH$_2$—CH$_2$—CH$_2$—O— |

EXAMPLE 2

A 1000-ml round bottom flask equipped with a mechanical stirrer and a condenser was charged with 36.09 g (0.26 mol) of 2-(3-hydroxypropyl)-5-methylfuran, 98.6 g (1.29 mol) of allyl chloride, 4.99 g (0.016 mol) of tetrabutylammonium bromide, 50 ml of water and 51.56 g (1.28 mol) of sodium hydroxide. The contents of the flask were vigorously stirred over a period of 5 hours at a temperature of 35°–40° C. The contents of the flask were filtered. The solids obtained were washed three times with diethyl ether. The filtrated was extracted with the combined etherial washing liquids. The extract was washed three times with water, dried over magnesium sulphate and evaporated to dryness, leaving 42.25 g of allyl 3-(5-methylfuryl-2)propyl ether. The structure was confirmed by $^1$H-NMR spectroscopy. The signals were assigned to the underlined hydrogen atoms (shifts relative to TMS, chloroform-$d_1$ solvent):

| | |
|---|---|
| 5.75–6.05 ppm (multiplet, 3 H): | protons attached to furan ring, —O—CH$_2$—CH=CH$_2$ |
| 5.05–5.4 ppm (multiplet, 2 H): | —O—CH$_2$—CH=CH$_2$ |
| 3.85–4.05 ppm (multiplet, 2 H): | —O—CH$_2$—CH=CH$_2$ |
| 3.46 ppm (triplet, $^3J_{H-H}$ 6.4 Hz, 2 H): | —CH$_2$—CH$_2$—CH$_2$—O— |
| 2.66 ppm (triplet, $^3J_{H-H}$ 7.6 Hz, 2 H): | —CH$_2$—CH$_2$—CH$_2$—O— |
| 2.24 ppm (singlet, 3 H): | CH$_3$— |
| 1.8–2.0 ppm (multiplet, 2 H): | —CH$_2$—CH$_2$—CH$_2$—O— |

EXAMPLE 3

A 1000-ml round bottom flask equipped with a magnetic stirrer and a condenser was charged with 42.25 g (0.24 mol) of allyl 3-(5-methylfuryl-2)propyl ether, 120 ml of water, 350 g of acetic acid and 2 g of concentrated sulphuric acid. The contents of the flask were stirred over a period of 2 hours at reflux temperature. After cooling to ambient temperature 400 ml of water was added and the mixture obtained was extracted with 800 ml of dichloromethane. The extract was washed successively twice with 400 ml of 10% aqueous sodium hydroxide and once with 400 ml water, dried over magnesium sulphate and evaporated to dryness, leaving 36.10 g of allyl 4,7-dioxooctyl ether (boiling point 79°–80° C. at 9.3 kPa). The structure was confirmed by $^1$H-NMR spectroscopy. The signals were assigned to the underlined hydrogen atoms (shifts relative to TMS, chloroform-$d_1$ solvent):

| | |
|---|---|
| 5.7–5.95 ppm (multiplet, 1 H): | —O—CH$_2$—CH=CH$_2$ |
| 5.0–5.3 ppm (multiplet, 2 H): | —O—CH$_2$—CH=CH$_2$ |
| 3.75–3.95 ppm (multiplet, 2 H): | —O—CH$_2$—CH=CH$_2$ |
| 3.35 ppm (triplet, $^3J_{H-H}$ 6.2 Hz, 2 H): | —CH$_2$—CH$_2$—CH$_2$—O— |
| 2.62 ppm (singlet, 4 H): | —CO—CH$_2$—CH$_2$—CO— |
| 2.49 ppm (triplet, $^3J_{H-H}$ 7.0 Hz, 2 H): | —CH$_2$—CH$_2$—CH$_2$—O— |
| 2.10 ppm (singlet, 3 H): | CH$_3$— |
| 1.7–1.9 ppm (multiplet, 2 H): | —CH$_2$—CH$_2$—CH$_2$—O— |

EXAMPLE 4

A 1000-ml round bottom flask equipped with a magnetic stirrer and a dropping funnel was charged with 130 g (0.38 mol) of 50-% m-chloroperbenzoic acid and 450 ml of chloroform. The dropping funnel was charged with 36.10 g (0.18 mol) of allyl 4,7-dioxooctyl ether. The contents of the dropping funnel were added drop-wise to the flask within 1 hour. During the addition the contents of the flask were stirred and kept at about 0° C. by cooling with an external cooling bath. After additional stirring overnight, during which the mixture was allowed to adopt room temperature, the mixture was filtered. The filtrate was extracted with an equal volume of 10-% aqueous sodium hydroxide and with an equal volume of water, dried over magnesium sulphate and evaporated to dryness, leaving 30.4 g of 4,7-dioxooctyl glycidyl ether as a colourless oil. The structure was confirmed by $^1$H-NMR spectroscopy. The signals were assigned to the underlined hydrogen atoms (shifts relative to TMS, chloroform-$d_1$ solvent):

3.5–3.6 ppm (multiplet, 1 H)
3.3–3.45 ppm (multiplet, 2 H)
3.1–3.3 ppm (multiplet, 1 H)       $-O-CH_2-CH\underset{O}{-}CH_2$,
2.95–3.05 ppm (multiplet, 1 H)
2.4–2.7 ppm (multiplet, 2 H)       $-CH_2-CH_2-CH_2-O-$
2.6–2.7 ppm (multiplet, 2 H)
2.59 ppm (singlet, 4 H):           $-CO-CH_2-CH_2-CO-$
2.07 ppm (singlet, 3 H):           $CH_3-$
1.6–1.80 ppm (multiplet, 2 H):     $-CH_2-CH_2-CH_2-O-$

EXAMPLES 5–11

A granulate of a terpolymer of ethene, propene and carbon monoxide with an LVN of 1.8 dl/g (measured in m-cresol at 60° C.), a crystalline melting point of 220° C. and containing 0.5% w of 1,3,5-tris(3,5-di-t.butyl-4-hydroxyphenylmethyl)-2,4,6-trimethylbenzene (commercially available antioxidant) and 0.5% w of a copolymer of ethylene and methacrylic acid, was blended with a sample of an additive in a commercial torque rheometer (designed for characterisation of polyvinylchloride and equipped with two spindles) operated at 240° C. The torque was measured at a speed of 37.5 rpm and 50 rpm of the spindles. During these measurements initial rapid changes in torque were seen as a result of the melting of the copolymer and of equilibration of temperature, whereafter the torque slowly increased as a result of instability of the melt. The rates of increase of torque observed and measured are given in Table 1.

EXAMPLE 12

The procedure of Examples 5–11 was substantially repeated with the difference that the addition of a sample of an additive to the polymer granulate was omitted. The result is presented in Table 1.

EXAMPLE 13

A granulate of a terpolymer of ethene, propene and carbon monoxide with an LVN of 1.8 dl/g (measured in m-cresol at 60° C.), a crystalline melting point of 220° C. and containing 0.3% wt of the n-octadecyl ester of 3-(3,5-di-t.butyl-4-hydroxyphenyl)propanoic acid (commercially available antioxidant), was blended with 1.7% wt glycidyl 2-hydroxymethylphenyl ether in a commercial torque rheometer (designed for characterisation of polyvinylchloride and equipped with two spindles) operated at 240° C. The torque was measured at a speed of 37.5 rpm and 50 rpm of the spindles. During the measurement initial rapid changes in torque were seen as a result of melting of the copolymer and of equilibration of temperature, whereafter the torque slowly increased as a result of instability of the melt. The rate of increase of torque thus found is given in Table 1.

EXAMPLE 14

The procedure of Example 1 was substantially repeated with the difference that the addition of glycidyl 2-hydroxymethylphenyl ether to the polymer granulate was omitted. The result is presented in Table 1.

TABLE 1

| Example No. | Additive [a] | Rate of increase of torque, Nm/min |
|---|---|---|
| 5 | Glycidyl 2-hydroxymethylphenyl ether | 5 |
| 6 | 4,7-dioxooctyl glycidyl ether | 7 |
| 7 | 4,7-dioxooctyl glycidyl ether (0.2) | 6 |
| 8 | Modified epoxy resin [b] | 10 |
| 9 | Diglycidyl ether of 2,2-bis(4-hydroxyphenyl)propane | 14 |
| 10 | 1,6-hexanediol diglycidyl ether | 16 |
| 11 | 1,2-epoxyeicosane | 24 |
| 12 | None | 21 |
| 13 | Glycidyl 2-hydroxymethylphenyl ether | 7 |
| 14 | None | 17 |

[a] 0.1 mol/kg copolymer, unless indicated otherwise.
[b] Modified epoxy resin with an epoxy group content of 0.58 eq/kg obtained by reacting the diglycidyl ether of 2,2-bis(4-hydroxy-phenyl)propane with 1,1,1-trimethylolpropane.

When the copolymer melt is subjected to torque measurements according to Examples 5–14 the rate of increase of torque is a measure of (in)stability of the melt. A low rate of torque increase implies a relatively high melt stability. Examples 5–8 show that glycidyl ethers having apart from one or more glycidyloxy groups, one or more primary hydroxy groups or ketonic carbonyl groups stabilize the copolymer melt to a larger extent than the known glycidyl ether additive which contains apart from glycidyloxy groups, secondary hydroxy groups (cf. Example 9). In the Examples 9, 10 and 11 epoxides have been tested which may be expected to be less sensitive to oxidative degradation than the glycidyl ethers of the invention. They were found to be inferior in stabilizing the alternating copolymer compared to the glycidyl ethers of the invention.

In the Examples 5–11 the epoxides were tested along with a copolymer of ethylene and methacrylic acid as an additive in the alternating copolymer. In Examples 13 and 14 the addition of the copolymer of ethylene and methacrylic acid has been omitted. The result of Example 13 indicates that addition of the copolymer of ethylene and methacrylic acid the glycidyl ethers of the invention provide a high degree of stabilization of the alternating copolymer.

While this invention has been described in detail for purposes of illustration, it is not to be construed as limited thereby but is intended to cover all changes and modifications within the spirit and scope thereof.

What is claimed is:

1. A melt stabilized copolymer compositions comprising a major amount of an alternating copolymer of carbon monoxide with one or more olefinically unsaturated compounds and a melt stabilizing amount of a glycidyl ether which comprises per molecule at least one epoxy group and at least one functional group selected from primary alcoholic hydroxy groups and ketonic carbonyl groups.

2. A composition as in claim 1 wherein said glycidyl ether comprises 1–3 epoxy groups per molecule.

3. A composition as in claim 2 wherein said glycidyl ether has an epoxy group content of from 0.1 to 10 eq/kg.

4. A composition as in claim 1 wherein said glycidyl ether is selected from the group consisting of
a) glycidyl ethers having the general formula (I)

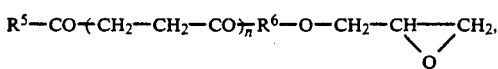

wherein $R^5$ is an alkyl group having up to 7 carbon atoms, n is 1 or 2 and $R^6$ is an alkylene bridging group having up to 6 carbon atoms, and
b) glycidyl ethers having the general formula (II)

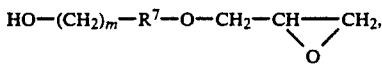

wherein M is an integer from 1–6, and $R^7$ is an (alk)arylene group having 6–10 carbon atoms.

5. A composition as in claim 4 wherein $R^5$ is a methyl group, $R^6$ is an alkylene bridging group having 3 to 6 carbon atoms of which 3 carbon atoms occur in the bridge, $R^7$ is a 1, 2-phenylene group, and both n and m are 1.

6. A composition as in claim 1 wherein said glycidyl ether is selected from the group consisting of glycidyl 2-hydroxymethylphenyl ether and 4,7-dioxooctyl glycidyl ether.

7. A composition as in claim 1 wherein said glycidyl ether is a modified epoxy resin that contains per molecule an average of from 1.5 to 2.5 epoxy groups and at least one primary hydroxy group, which modified epoxy resin is obtainable by reacting
a) an epoxy resin having an average of more than 1.5 and at most 2 glycidyloxy groups per molecule and an epoxy group content of from 1 to 7 eq/kg, with
b) an aliphatic tri- or tetrahydric primary alcohol having from 5 to 12 carbon atoms.

8. A compositions as in claim 7 wherein said aliphatic primary alcohol is a trihydric alcohol.

9. A composition as in claim 7 wherein said epoxy resin with from 1.5 to 2 glycidyloxy groups comprises a diglycidyl ether selected from the group consisting of a dihydric phenol and of a 2,2-bis(4-hydroxyphenyl)propane.

10. A composition as in claim 7 wherein said modified epoxy resin has an epoxy group content of from 0.5–0.7 eq/kg and is obtainable by reacting the diglycidyl ether of 2,2-bis(4-hydroxyphenyl)propane with 1,1,1-trimethylolpropane.

11. A composition as in claim 7 wherein said modified epoxy resin is gel-free.

12. A composition as in claim 1 wherein said stabilizing additive(s) is (are) added in an amount of from 0.005 to 1.0 eq/kg but not more than 20% wt based on the weight of the composition.

13. A composition as in claim 12 wherein said stabilizing additive(s) is (are) added in a quantity of from 0.02 to 0.2 eq/kg but not more than 5% wt based on the weight of the composition.

14. A composition as in claim 1 further comprising one or more additional additives selected from the group consisting of sterically hindered phenolic compounds, aromatic amines, hydroxybenzophenones, hydroxyphenylbenzotriazoles, aluminum hydroxides, carboxylic esters of glycerol, acid amides of monocarboxylic acids, and copolymers of ethylene and acrylic acid or methacrylic acid.

15. A process for improving the melt stability of copolymers of carbon monoxide with one or more olefinically unsaturated compounds comprising the addition thereto of a stabilizing amount of a glycidyl ether which comprises per molecule at least one epoxy group and at least one functional group selected from primary alcoholic hydroxy groups and ketonic carbonyl groups.

16. A process as in claim 14 wherein said glycidyl ether is selected from the group consisting of:
a) glycidyl ethers having the general formula (I)

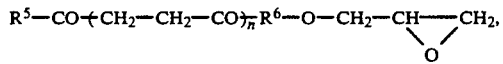

wherein $R^5$ is an alkyl group having up to 7 carbon atoms, n is 1 or 2 and $R^6$ is an alkylene bridging group having up to 6 carbon atoms, and
b) glycidyl ethers having the general formula (II)

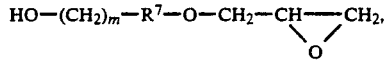

wherein M is an integer from 1–6, and $R^7$ is an (alk)arylene group having 6–10 carbon atoms.

17. A process as in claim 14 wherein said glycidyl ether is present in an amount of from 0.005 to 1.0 eg/kg but not more than 20% wt based on the weight of the composition.

* * * * *